United States Patent
Rivard et al.

(10) Patent No.: US 10,880,521 B2
(45) Date of Patent: Dec. 29, 2020

(54) SYSTEM, METHOD, AND COMPUTER PROGRAM FOR TRANSMITTING FACE MODELS BASED ON FACE DATA POINTS

(71) Applicant: Duelight LLC, Sunnyvale, CA (US)

(72) Inventors: William Guie Rivard, Menlo Park, CA (US); Brian J. Kindle, Sunnyvale, CA (US); Adam Barry Feder, Mountain View, CA (US)

(73) Assignee: DUELIGHT LLC, Sunnyvale, CA (US)

( * ) Notice: Subject to any disclaimer, the term of this patent is extended or adjusted under 35 U.S.C. 154(b) by 0 days.

(21) Appl. No.: 16/547,358

(22) Filed: Aug. 21, 2019

(65) Prior Publication Data

US 2019/0379863 A1    Dec. 12, 2019

Related U.S. Application Data

(63) Continuation of application No. 16/206,241, filed on Nov. 30, 2018.

(60) Provisional application No. 62/618,520, filed on Jan. 17, 2018.

(51) Int. Cl.
| | | |
|---|---|---|
| *H04N 7/14* | (2006.01) | |
| *H04N 7/15* | (2006.01) | |
| *H04L 12/58* | (2006.01) | |
| *H04L 29/06* | (2006.01) | |
| *G06T 13/40* | (2011.01) | |
| *G06T 19/00* | (2011.01) | |
| *G10L 21/10* | (2013.01) | |
| *H04L 12/18* | (2006.01) | |
| *G10L 25/63* | (2013.01) | |

(52) U.S. Cl.
CPC ............ *H04N 7/157* (2013.01); *G06T 13/40* (2013.01); *G06T 19/00* (2013.01); *G10L 21/10* (2013.01); *H04L 12/1827* (2013.01); *H04L 51/04* (2013.01); *H04L 51/046* (2013.01); *H04L 65/403* (2013.01); *H04L 65/80* (2013.01); *H04N 7/147* (2013.01); *G06T 2219/024* (2013.01); *G10L 25/63* (2013.01); *G10L 2021/105* (2013.01); *H04L 51/10* (2013.01)

(58) Field of Classification Search
CPC ........................................................ H04N 7/14
See application file for complete search history.

(56) References Cited

U.S. PATENT DOCUMENTS

| | | |
|---|---|---|
| 10,708,545 B2 | 7/2020 | Rivard et al. |
| 2006/0215016 A1 | 9/2006 | Cohen et al. |
| 2015/0042743 A1 | 2/2015 | Cullen |
| 2015/0244980 A1 | 8/2015 | Matthews |

(Continued)

OTHER PUBLICATIONS

International Search Report and Written Opinion from PCT Application No. PCT/US 19/13847, dated Apr. 12, 2019.

(Continued)

*Primary Examiner* — Olisa Anwah
(74) *Attorney, Agent, or Firm* — Zilka-Kotab, P.C.

(57) ABSTRACT

A system, method, and computer program are provided for receiving face models based on face data points. In use, a real-time face model is received, wherein the real-time face model includes one or more face data points. Real-time face data points are received, including additional one or more face data points. The real-time face model is manipulated based on the real-time face data points.

18 Claims, 12 Drawing Sheets

(56) References Cited

U.S. PATENT DOCUMENTS

| | | |
|---|---|---|
| 2016/0006987 A1* | 1/2016 | Li .................. H04L 12/1827 |
| | | 348/14.03 |
| 2017/0006322 A1 | 1/2017 | Dury et al. |
| 2017/0154211 A1 | 6/2017 | Shaburov et al. |
| 2017/0208292 A1 | 7/2017 | Smits |
| 2018/0342091 A1 | 11/2018 | Seibert et al. |
| 2019/0222807 A1 | 7/2019 | Rivard et al. |

OTHER PUBLICATIONS

Rivard et al., U.S. Appl. No. 16/206,241, filed Nov. 30, 2018.
Non-Final Office Action from U.S. Appl. No. 16/206,241, dated Jun. 20, 2019.
Non-Final Office Action from U.S. Appl. No. 16/206,241, dated Sep. 26, 2019.
International Preliminary Examination Report from PCT Application No. PCT/US2019/13847, dated Jul. 30, 2020.
Notice of Allowance from U.S. Appl. No. 16/206,241, dated Mar. 5, 2020.

* cited by examiner

SYSTEM, METHOD, AND COMPUTER PROGRAM FOR TRANSMITTING FACE MODELS BASED ON FACE DATA POINTS

CROSS-REFERENCES TO RELATED APPLICATIONS

The present application is a continuation of, and claims priority to U.S. patent application Ser. No. 16/206,241, titled "SYSTEM, METHOD, AND COMPUTER PROGRAM FOR TRANSMITTING FACE MODELS BASED ON FACE DATA POINTS," filed Nov. 30, 2018, which in turn claims priority to and the benefit of U.S. Provisional Patent Application No. 62/618,520, titled "SYSTEM, METHOD, AND COMPUTER PROGRAM FOR TRANSMITTING FACE MODELS BASED ON FACE DATA POINTS," filed Jan. 17, 2018, which is hereby incorporated by reference for all purposes.

FIELD OF THE INVENTION

The present invention relates to transmitting a face model, and more particularly to transmitting a face model based on face data points.

BACKGROUND

Current real-time communication systems (e.g. video conference, etc.) require high bandwidth and consume a large volume of data during operation. To enable fluid video conferencing capabilities, such systems generally require a user to choose between lower data rates (lower quality) or higher data rates (higher quality). In another instance, a relatively unreliable network connection for a connected user may directly cause a lower rate video stream (and hence a lower quality stream) to be sent.

There is thus a need for addressing these and/or other issues associated with the prior art.

SUMMARY

A system, method, and computer program are provided for receiving face models based on face data points. In use, a real-time face model is received, wherein the real-time face model includes one or more face data points. Real-time face data points are received, including additional one or more face data points. The real-time face model is manipulated based on the real-time face data points.

DETAILED DESCRIPTION

Figure 1:
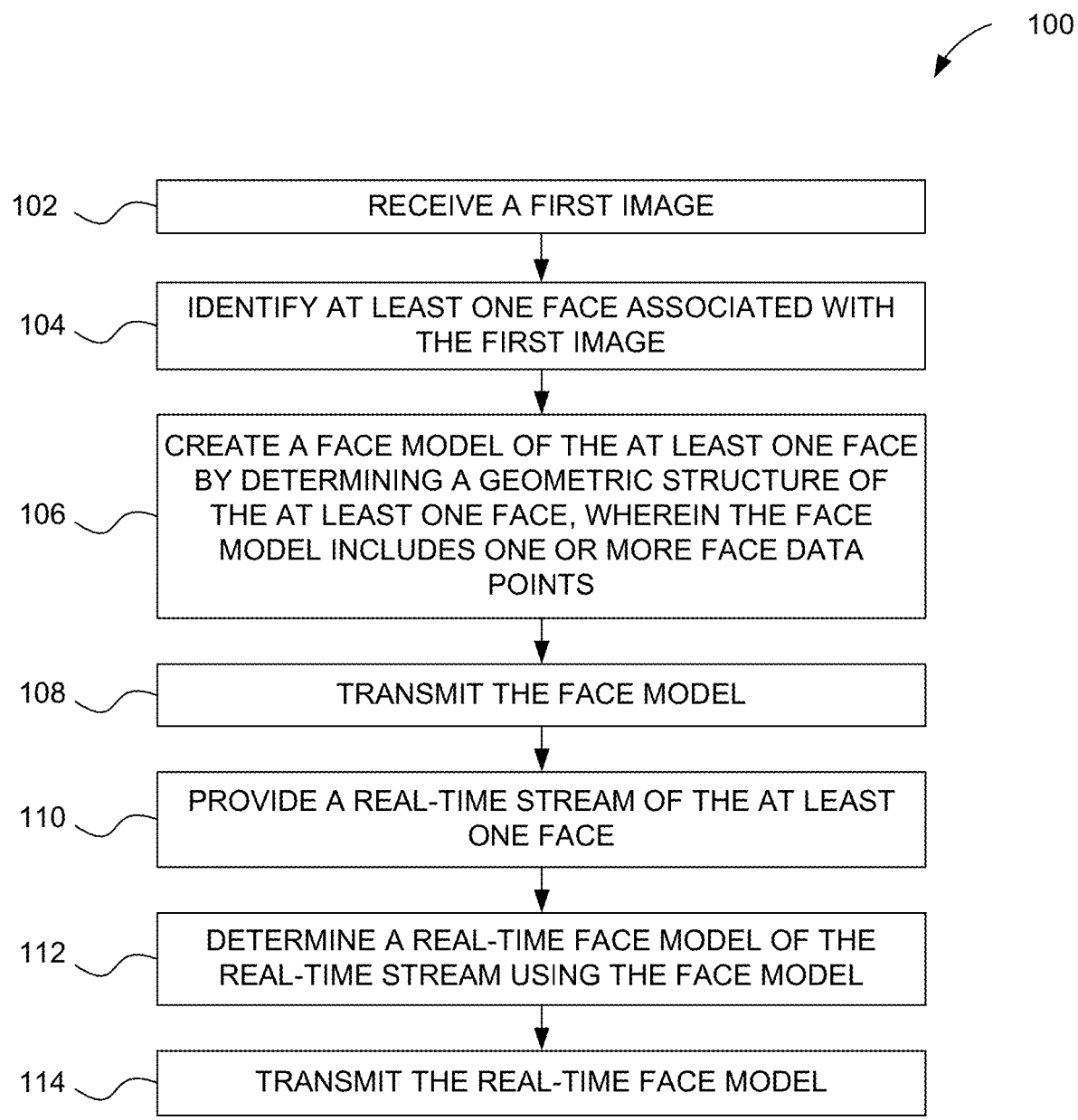
FIG. 1 illustrates an exemplary method for transmitting face models based on face data points, in accordance with one possible embodiment.

FIG. 1 illustrates an exemplary method 100 for transmitting face models based on face data points, in accordance with one possible embodiment. As shown, a first image is received (see operation 102), and at least one face associated with the first image is identified (see operation 104). In one embodiment, identifying the at least one face may include segmenting the first image into regions, and determining that one or more of the regions comprises a face. In another embodiment, identifying the at least one face may include a classifier engine, such as a neural network classifier engine, identifying a face region in the first image.

In various embodiments, the first image may be received via a camera, via an application, from a local storage (e.g. device memory), from a remote storage (e.g. cloud, external server, etc.), etc. As such, the first image may be the result of a recent capturing by a camera device, or may be the result of retrieving or transferring of a previously captured and stored image.

Next, a face model is created of the at least one face by determining a geometric structure of the at least one face, wherein the face model includes one or more face data points (see operation 106), and the face model is transmitted (see operation 108). In the context of the present description, a face model includes face data points from which a face may be visually constructed. In one embodiment, a face model may include a mapping of facial features (e.g. face nodal points) to the geometric structure. Additionally, face data points may include facial features (e.g. distance between the eyes, width of the nose, depth of the eye socket, shape of the bone structure, width of jaw, etc.), which may be stored as face nodal points.

In the context of the present description, a face model may include a geometric mesh or collection of geometric objects. The geometric objects may include two-dimensional vertices or three-dimensional vertices. The face model therefore provides sufficient visual detail for rendering of a face (e.g., a human face or an avatar face). Additionally, face data points may include any number of data points based on the face model.

Further, a real-time stream of the at least one face is provided (see operation 110), and a real-time face model of the real-time stream using the face model is determined (see operation 112). Next, the real-time face model is transmitted. See operation 114.

In the context of the present description, a real-time stream may include a video chat and/or conference call. Additionally, the real-time stream may function in near-real time such that data transferred is processed within a set time (e.g. within 500 milliseconds). Additionally, the real-time stream may function as a streaming of data such that data is continuously transferred with minimal latency. In a separate embodiment, the real-time stream may include a delay (e.g. <=5 seconds) due to buffering, a change in network (e.g. switch from WiFi to cellular network), etc.

Further, a real-time face model may include real-time face data points from which a face may be rendered. In this manner, as an individual's face changes in the course of a conversation, such changes may be observed and analyzed for movement by a first device and transmitted to a second device; the second device configured to render and animate the real-time face model.

In one embodiment, face data points may be used to generate a stream of video frames that depict a face speaking by modifying a face model according to speech or expression. For example, a face model may be sent from the first device to the second device. A video stream may be established (e.g., initially) from the first device to the second device. In one embodiment, rather than sending all data associated with video frames of the face of the user in real time, the data associated with the face data points may be sent instead (thereby reducing data bandwidth), and such face data points sent from the first device may be used to manipulate the face model at the second device. As such, if the user at the first device raises an eyebrow, rather than sending video image data for the entire frame or even motion estimated image data for the eyebrow, the face data points for the eyebrow may be sent instead (e.g. move point 1 up, move point 2 to the side, etc.) and the face model at the second device may be modified and rendered in real time to track and depict the raised eyebrow.

As another example, a first user may capture an image of the first user. Such image may be processed to determine a face model including face data points. In one embodiment, the face model may include both the first image and the face data points. Such face model may then be transmitted to a second device, which may then open the face model to display the image of the first user. After establishing a video stream with the first user, the second device of the second user may then manipulate the original face model such that changes in face nodal points of the first user may be transmitted. In contrast to sending the entire image data (e.g. video frames) of the first user, the first user may then need to only send changes to face nodal points to the second device, and the second device may in turn manipulate the original face model (which already includes image data) to give the appearance of a real-time video chat session. In this manner, a video stream may be achieved while minimizing data transferred from a first device to a second device. Of course, it is to be appreciated that any number of devices may be included in the exchange of the face model and transmittal of the real-time face model.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2A:
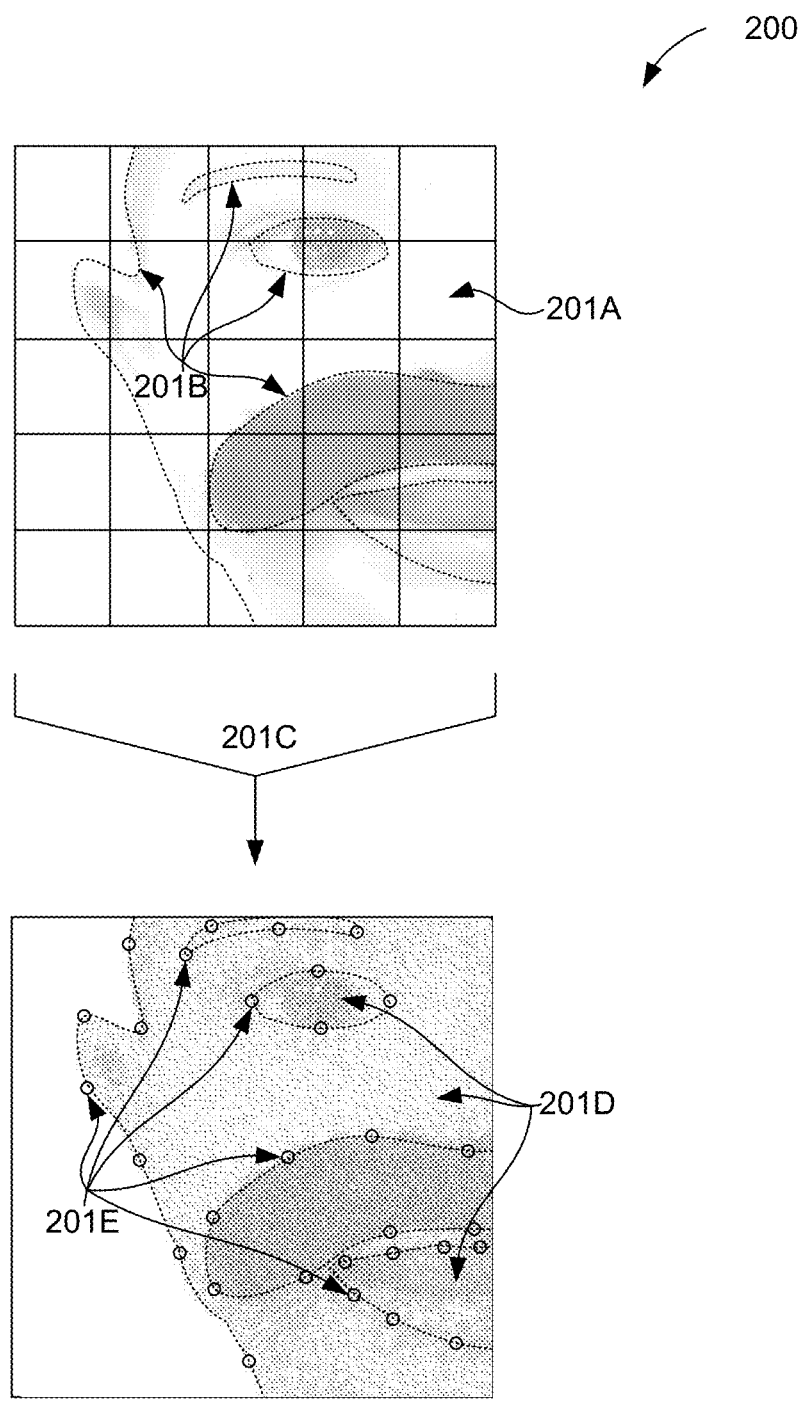
FIG. 2A illustrates a method for determining face data points, in accordance with one embodiment.

FIG. 2A illustrates a method 200 for determining face data points, in accordance with one embodiment. As an option, the method 200 may be implemented in the context of any one or more of the embodiments set forth in any previous and/or subsequent figure(s) and/or description thereof. Of course, however, the method 200 may be implemented in the context of any desired environment. Further, the aforementioned definitions may equally apply to the description below.

As shown, an image 201A may be received and outlines 201B of facial features may be extracted. In one embodiment, such outlines 201B may trace around facial features. Additionally, such facial features may correspond with face nodal points. In another embodiment, the image 201A may be converted into a mesh (or other geometric) frame by which contours and features may determined and extracted. More generally, any technically feasible technique may be used to characterize facial features and feature positions in image 201A.

After determining outlines 201B of facial features, further processing 201C may result in minute data points 201D and main data points 201E. In one embodiment, minute data points 201D may be sufficient to be sent to manipulate the face model in real time. If additional facial data points are needed, then minute data points 201D may be sent as well to more accurately modify the face model. Of course, it is to be appreciated that any number of data points may be constructed (whether minute data points 201D or main data points 201E) and transmitted.

As an example, image 201A may be processed, resulting in outlines 201B, minute data points 201D, and main data points 201E. A package including 201A and any or all of outlines 201B, minute data points 201D, and main data points 201E may be sent to receiving device(s). Image 201A may then be manipulated at the receiving device(s) by adjusting any or all of outlines 201B, minute data points 201D, and main data points 201E by receiving, in real-time, updated locations for any or all of outlines 201B, minute data points 201D, and main data points 201E. In this manner, any change in the face may be sent as a change in location for any of outlines 201B, minute data points 201D, and main data points 201E. In one embodiment, portions of image 201A are texture-mapped onto a geometric mesh constructed to model the face. Furthermore, movements of data points for the geometric mesh (e.g., minute data points 201D) are tracked by the first device and transmitted to the second device, which modifies and renders the geometric mesh based on the movements.

Figure 2B:
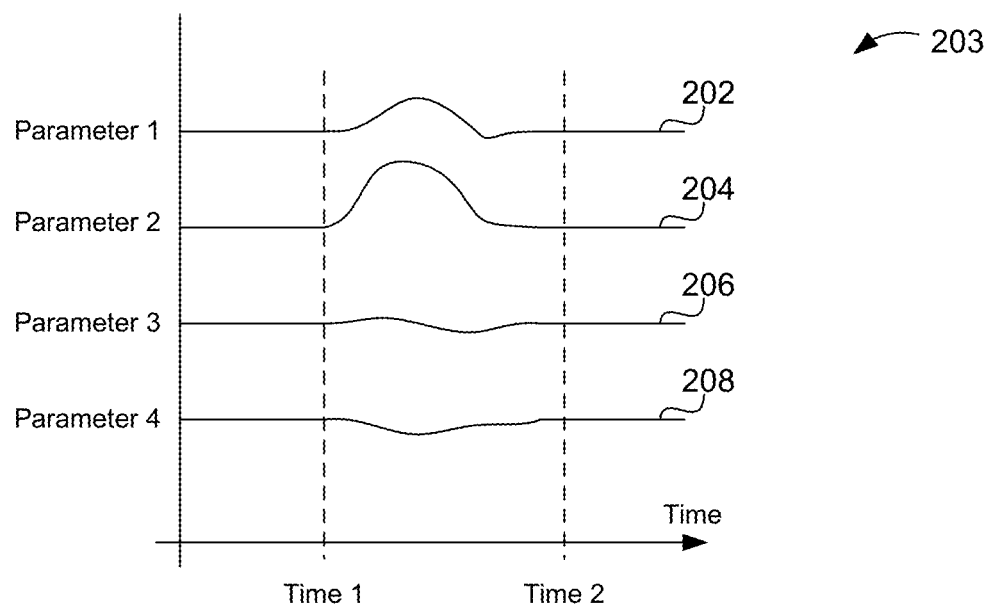
FIG. 2B illustrates one or more parameters, in accordance with one embodiment.

FIG. 2B illustrates one or more parameters 203, in accordance with one embodiment. As an option, the one or more parameters 203 may be implemented in the context of any one or more of the embodiments set forth in any previous and/or subsequent figure(s) and/or description thereof. Of course, however, the one or more parameters 203 may be implemented in the context of any desired environment. Further, the aforementioned definitions may equally apply to the description below.

As shown, a parameter 1 202, parameter 2 204, parameter 3 206, and parameter 4 208 are included on a plot. Between time 1 and time 2, variations for each of parameters 1-4 202-208 are shown. In the context of the present description, parameters 1-4 202-208 may relate to animation parameters associated with a sequence of video frames. For example, parameters 1-4 202-208 may relate to tracking a movement of the eyes, a scrunching of the nose, a shifting of the jaw, a movement of the face bone structure, a raising or lowering of the eyebrows, a movement of the lips (e.g. smile, frown, etc.), etc. In this manner, each of the parameters 1-4 202-208 may each relate to a specific movement of the face. Of course, it is to be appreciated that additional parameters (beyond parameters 1-4 202-208) may be used to track a specific feature of the face. As such, in one embodiment, parameters 1-4 202-208 represent a set of time series values for animating a face model. In other words, a face feature is tracked with respect to time. The tracking may be performed by the first device.

Additionally, a correlation between parameters 1-4 202-208 may be used to associate a first parameter to a second (or any other number) of parameters. For example, a smile parameter may also generally be associated with a slight raise of the eyebrows, and an opening of the eyes. Such parameters may be further correlated to audio (e.g. voice) such that when a tone of voice is captured, visual parameters associated with the tone of voice may be captured.

In one embodiment, a user may start to smile at Time 1, causing face data points to move relative to other facial features. One or more of the parameters 1-4 202-208 may quantify such movement associated with the user smiling so that a corresponding face model may be rendered to smile accordingly. Such parameters may be estimated and/or collected to create animation controls associated with the face model for rendering a video at the second device of the face of the user at the first device. In one embodiment, such parameters may be correlated with an audio such that, when audio is additionally captured, the correlation between the audio and the parameters may be used to modify the parameters (and change the underlying image) based on the later captured audio.

In one usage mode, a first user may position a camera on a first smartphone (e.g., the first device) to capture video frames of their face, and parameters 1-4 202-208 may be estimated from the video frames. For example, the video frames may be processed by a processing unit within the first smartphone to estimate the parameters 1-4 202-208. Parameters 1-4 202-208 are transmitted to a second smartphone (e.g., the second device) and used to render video frames of the face model animated according to the parameters 1-4 202-208. A second user may view the rendered video frames as a depiction of the first user talking in a video conference call. In certain embodiments, audio may be correlated with expected face model movements and used to create an inference of how the face model of the first user should be animated to be consistent with their spoken words. In one embodiment, such inference may be used to manipulate the face model as discussed in relation to FIG. 2A and FIG. 1. In one usage scenario, the first user may not reliably face the camera of the first smartphone, and without reliably facing the camera, estimating parameters 1-4 202-208 may not be possible from video input alone. Therefore, the parameters 1-4 202-208 may be estimated instead from audio input from the first user, with phonetic deconstruction of speech from the first user providing a basis for estimating parameters 1-4 202-208. Phonetic elements of speech and transitions between different phonetic elements have a typical mouth and/or facial position and movement, respectively. When inferring the parameters and/or an overall expression from audio input, the face model may be posed into an overall neutral position, with facial movement associated with speech animating the face model based on inferred movement from the phonetic elements. Additionally, head movement (or another parameter associated with the face and/or accompanying area) may be provided, such as when laughter is detected in the audio input.

Figure 2C:
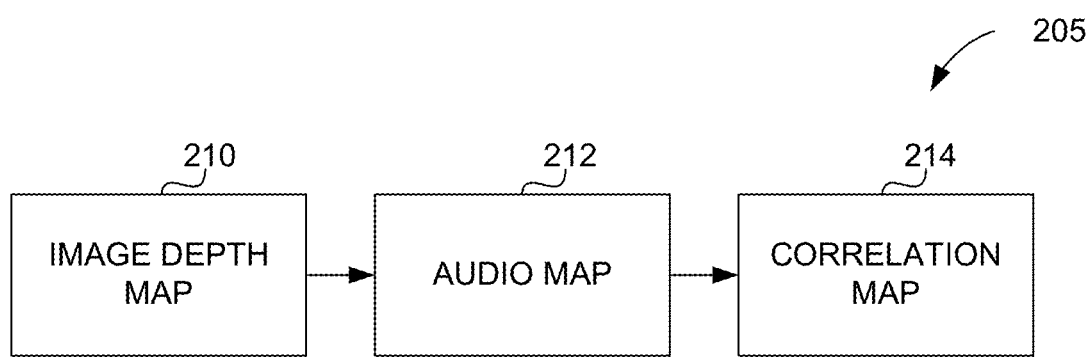
FIG. 2C illustrates a method to correlate phonetics/emotions with an image depth map, in accordance with one embodiment.

FIG. 2C illustrates a method 205 to correlate phonetics/emotions with an image depth map, in accordance with one embodiment. As an option, the method 205 may be implemented in the context of any one or more of the embodiments set forth in any previous and/or subsequent figure(s) and/or description thereof. Of course, however, the method 205 may be implemented in the context of any desired environment. Further, the aforementioned definitions may equally apply to the description below.

As shown, the method may include an image depth map 210, an audio map 212, and a correlation map 214. In one embodiment, the correlation map may be created based on the face model (and associated face data points) of FIG. 1 and FIG. 2A, and the audio map of FIG. 2B. In one embodiment, the image depth map 210 is used to generate a geometric model and movement estimates of the face of the first user. Animation parameters (e.g. 1-4 202-208) derived from the image dept map 210 may be transmitted to the second device. In alternative embodiments, no depth map is available (e.g., lack of hardware support) and image data is used to generate the geometric model and movement estimates.

In one embodiment, the correlation map 214 may include matching up audio associated phonetics, intonations, emotions, etc. with actual geometric data points associated with a face. Such correlation map may be initially created and/or captured over time (to improve accuracy). Additionally, the correlation map 214 may be sent to one or more recipients. After receiving the correlation map and the face model (e.g. of FIG. 1), the second device may receive face data points thereafter to manipulate the face model. Furthermore, the first device may receive audio data and generate animation parameters based on the audio data; the first device may transmit the animation parameters and audio data to the second device. In general, the audio data, in combination with the correlation map already received, may be used to manipulate the face model such that the face model may be modified in real time to correlate audio data with visual modifications. In an alternative embodiment, rather than sending all data associated with a video conference, audio data may be sent and used to modify a face model such that the face model responds in a manner consistent with how the user responds in real time. In various embodiments, inferring facial animation based on phonetic elements may be performed at the sender side (e.g., first smartphone), at the receiver side (e.g., second smartphone), or at an intermediary server. Furthermore, synchronizing audio with animation of the face model may be performed at the sender side, the receiver side, or the intermediary server.

Figure 2D:
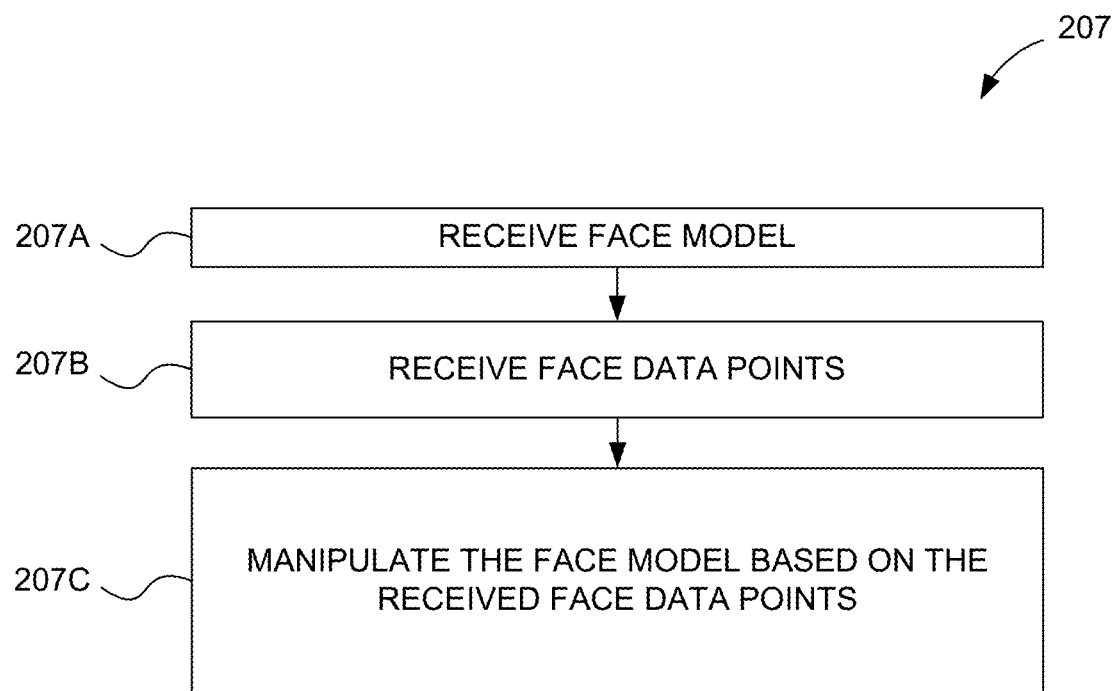
FIG. 2D illustrates a method to manipulate a face model, in accordance with one embodiment.

FIG. 2D illustrates a method 207 to manipulate a face model, in accordance with one embodiment. As an option, the method 207 may be implemented in the context of any one or more of the embodiments set forth in any previous and/or subsequent figure(s) and/or description thereof. Of course, however, the method 207 may be implemented in the context of any desired environment. Further, the aforementioned definitions may equally apply to the description below.

As shown, a face model is received (see operation 207A), and face data points are received (see operation 207B). Next, the face model is manipulated based on the received face data points. See operation 207C. As an example, an initial face model of an individual may be received. Thereafter, rather than sending the entire face model (or even the data stream of such face), face data points may be received to manipulate the face. For example, consistent with FIG. 2A, such face data points may be based on visual modification to the face. In another embodiment, consistent with FIG. 2B, such face data points may be based on audio parameters (and thence an audio map). Alternatively, parameters 1-4 202-208 are generated to concisely describe the motion of a number of face data points. In one embodiment, the parameters 1-4 202-208 may be mapped to control levers on an animation rigging of the face model.

In other embodiments, after capturing an image and depth map of a person, a picture of the person may be displayed. From such an image, a face may be extracted and a 3D model of such face may be constructed using polygons (or other geometric forms, mesh, etc.). From the 3D model, an expression may be assumed or surmised. For example, the person's face may include an underlying skeleton, various muscles, various chunks of fat and soft tissue, etc., and each muscle may function as a lever, such that, depending on how much the muscle is contracted, it will contribute to a different expression. In such an example, closing eyes may be the result of muscles around the eyes contracting. As such, there are a number of parameters that can be used to convey facial expression. In one embodiment, such parameters may be used to convey facial expression through an avatar, or some depiction of an inanimate object.

Furthermore, video and/or audio inputs may be used to generate parameters for conveying expressions for a face model in real time. In one embodiment, such parameters may correspond with Eigenfaces (i.e. eigenvalue(s) applied to a face to convey varying degrees of canonical facial expressions).

In one embodiment, transmitting the 3D model (rather than image data associated with real time video frames) may require significantly less bandwidth (e.g., an amount of data usage over time) because parameters (of smaller data size) may be transmitted. In this manner, in one embodiment, video conferences may therefore occur on less than optimal network connections (as less data usage would be required or used).

As an example, an individual may attempt to establish a video conference in conditions where poor cellular data coverage may exist, or in conditions where a cellular data rate may drop suddenly (for any number of potential reasons). Further, an individual may be located in a very network congested area (high cellular data utilization, with individual bandwidth highly constrained). In such instances (in addition to many others), it may be desired to maintain the video conference. Further, it may not be desired to simply convert to an audio-only call. As such, real-time, parameter-based data points may be sent and used (based on visual or audio input) to animate, at the receiving party device (e.g., the second device), a face model of a sending party. In practice, there may be two face models; one face model for each of two parties on a video call. As such, in one embodiment, the real-time face model may be automatically transmitted based on network latency threshold or a dropped packet threshold condition.

Further, if a person has already reached a periodic limit for a higher cellular speed grade, then methods as described herein would allow the person to maintain functionality (e.g. video conference capability) while utilizing a lower bandwidth connection. In one embodiment, such reduction in bandwidth may be based on a set percentage (e.g. 50%, 75%) of an allocated limit.

In one embodiment, the face model may be commercialized. For example, rather than using a face model associated with an individual, a face model associated with another individual (e.g. movie star, etc.) or character (e.g. Disney™ character, etc.) may be purchased and utilized by a caller or receiver in a video call. In this manner, face data points may be used to manipulate a face model other than an individual's own face model.

Further, in another embodiment, an environment may be selected to be associated with a face model. For example, a user could select to be in a sunny or rainy environment. Or, based on emotions detected, the environment may change accordingly (e.g. a sad voice may cause rain clouds to appear, etc.). In one embodiment, such environment may be an overlay to the face model or an underlay behind the face model. In one embodiment, the first user selects an emotion prior to establishing a call, and the emotion is conveyed in the environment (e.g., as an overlay, underlay, or combination thereof). In another embodiment, emotional state of the first user is detected in real-time and used to modify the environment in real-time.

In one embodiment, during a high bandwidth video conference, one or more triggers may prompt use of the face model and face data points rather than real time video frames. Any bandwidth and/or network latency metric may be used as a trigger. For example, if latency increases to a certain threshold, or if a number of dropped packets increases to a certain threshold, such may be used to trigger use of the face model and face data points rather than real time video frames. This mechanism allows for a transition from a conventional video call to a lower-bandwidth video call, while maintaining continuity of the call.

Figure 3A:
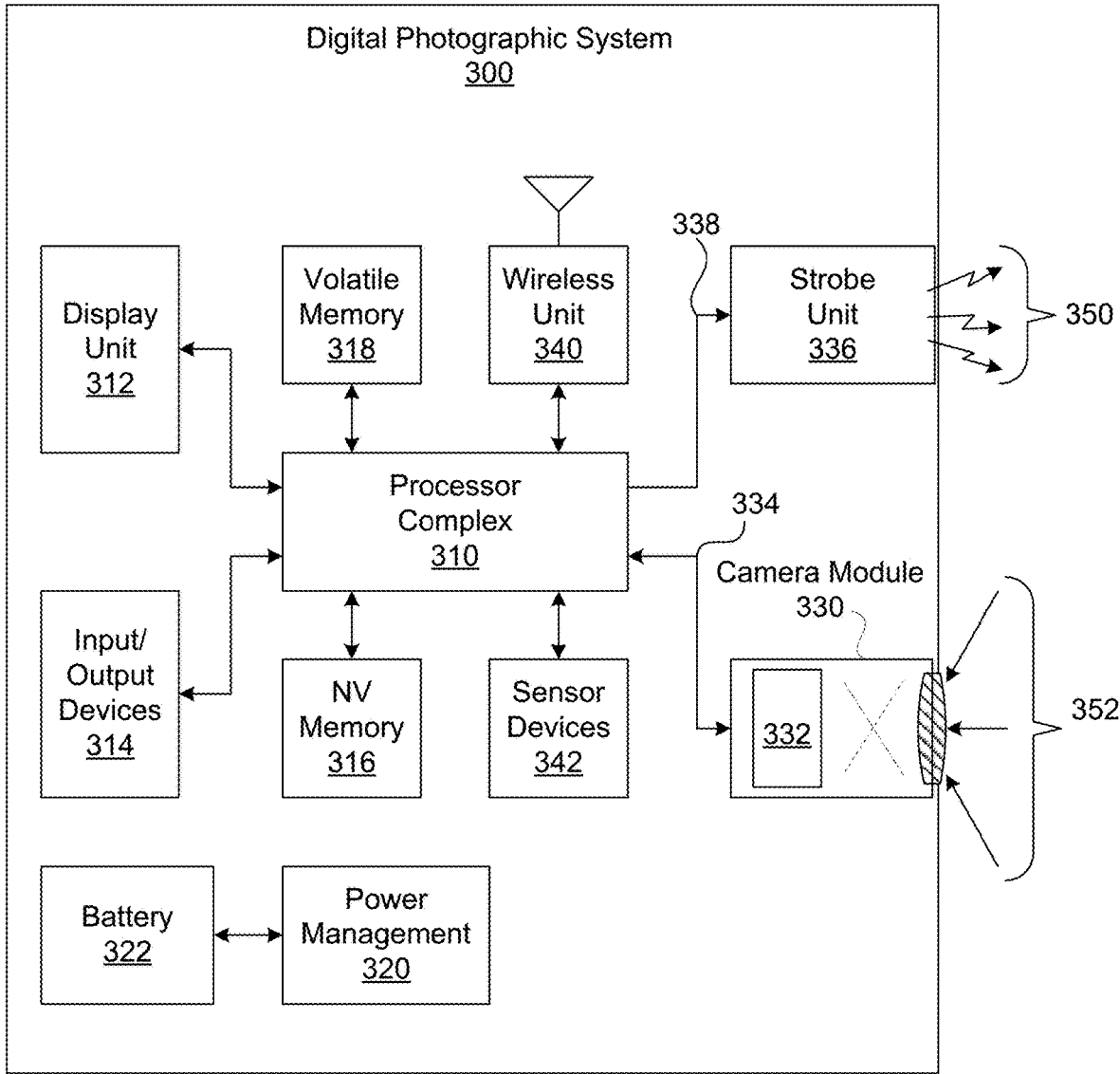
FIG. 3A illustrates a digital photographic system, in accordance with an embodiment.

FIG. 3A illustrates a digital photographic system 300, in accordance with one embodiment. As an option, the digital photographic system 300 may be implemented in the context of the details of any of the Figures disclosed herein. Of course, however, the digital photographic system 300 may be implemented in any desired environment. Further, the aforementioned definitions may equally apply to the description below.

As shown, the digital photographic system 300 may include a processor complex 310 coupled to a camera module 330 via an interconnect 334. In one embodiment, the processor complex 310 is coupled to a strobe unit 336. The digital photographic system 300 may also include, without limitation, a display unit 312, a set of input/output devices 314, non-volatile memory 316, volatile memory 318, a wireless unit 340, and sensor devices 342, each coupled to the processor complex 310. In one embodiment, a power management subsystem 320 is configured to generate appropriate power supply voltages for each electrical load element within the digital photographic system 300. A battery 322 may be configured to supply electrical energy to the power management subsystem 320. The battery 322 may implement any technically feasible energy storage system, including primary or rechargeable battery technologies. Of course, in other embodiments, additional or fewer features, units, devices, sensors, or subsystems may be included in the system.

In one embodiment, a strobe unit 336 may be integrated into the digital photographic system 300 and configured to provide strobe illumination 350 during an image sample event performed by the digital photographic system 300. In another embodiment, a strobe unit 336 may be implemented as an independent device from the digital photographic system 300 and configured to provide strobe illumination 350 during an image sample event performed by the digital photographic system 300. The strobe unit 336 may comprise one or more LED devices, a gas-discharge illuminator (e.g. a Xenon strobe device, a Xenon flash lamp, etc.), or any other technically feasible illumination device. In certain embodiments, two or more strobe units are configured to synchronously generate strobe illumination in conjunction with sampling an image. In one embodiment, the strobe unit 336 is controlled through a strobe control signal 338 to either emit the strobe illumination 350 or not emit the strobe illumination 350. The strobe control signal 338 may be implemented using any technically feasible signal transmission protocol. The strobe control signal 338 may indicate a strobe parameter (e.g. strobe intensity, strobe color, strobe time, etc.), for directing the strobe unit 336 to generate a specified intensity and/or color of the strobe illumination 350. The strobe control signal 338 may be generated by the processor complex 310, the camera module 330, or by any other technically feasible combination thereof. In one embodiment, the strobe control signal 338 is generated by a camera interface unit within the processor complex 310 and transmitted to both the strobe unit 336 and the camera module 330 via the interconnect 334. In another embodiment, the strobe control signal 338 is generated by the camera module 330 and transmitted to the strobe unit 336 via the interconnect 334.

Optical scene information 352, which may include at least a portion of the strobe illumination 350 reflected from objects in the photographic scene, is focused as an optical image onto an image sensor 332 within the camera module 330. The image sensor 332 generates an electronic representation of the optical image. The electronic representation comprises spatial color intensity information, which may include different color intensity samples (e.g. red, green, and blue light, etc.). In other embodiments, the spatial color intensity information may also include samples for white light. The electronic representation is transmitted to the processor complex 310 via the interconnect 334, which may implement any technically feasible signal transmission protocol.

In one embodiment, input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, the input/output devices 314 include a capacitive touch input surface coupled to a display unit 312. A touch entry display system may include the display unit 312 and a capacitive touch input surface, also coupled to processor complex 310.

Additionally, in other embodiments, non-volatile (NV) memory 316 is configured to store data when power is interrupted. In one embodiment, the NV memory 316 comprises one or more flash memory devices (e.g. ROM, PCM, FeRAM, FRAM, PRAM, MRAM, NRAM, etc.). The NV memory 316 comprises a non-transitory computer-readable medium, which may be configured to include programming instructions for execution by one or more processing units within the processor complex 310. The programming instructions may implement, without limitation, an operating system (OS), UI software modules, image processing and storage software modules, one or more input/output devices 314 connected to the processor complex 310, one or more software modules for sampling an image stack through camera module 330, one or more software modules for presenting the image stack or one or more synthetic images generated from the image stack through the display unit 312. As an example, in one embodiment, the programming instructions may also implement one or more software modules for merging images or portions of images within the image stack, aligning at least portions of each image within the image stack, or a combination thereof. In another embodiment, the processor complex 310 may be configured to execute the programming instructions, which may implement one or more software modules operable to create a high dynamic range (HDR) image.

Still yet, in one embodiment, one or more memory devices comprising the NV memory 316 may be packaged as a module configured to be installed or removed by a user. In one embodiment, volatile memory 318 comprises dynamic random access memory (DRAM) configured to temporarily store programming instructions, image data such as data associated with an image stack, and the like, accessed during the course of normal operation of the digital photographic system 300. Of course, the volatile memory may be used in any manner and in association with any other input/output device 314 or sensor device 342 attached to the process complex 310.

In one embodiment, sensor devices 342 may include, without limitation, one or more of an accelerometer to detect motion and/or orientation, an electronic gyroscope to detect motion and/or orientation, a magnetic flux detector to detect orientation, a global positioning system (GPS) module to detect geographic position, or any combination thereof. Of course, other sensors, including but not limited to a motion detection sensor, a proximity sensor, an RGB light sensor, a gesture sensor, a 3-D input image sensor, a pressure sensor, and an indoor position sensor, may be integrated as sensor devices. In one embodiment, the sensor devices may be one example of input/output devices 314.

Wireless unit 340 may include one or more digital radios configured to send and receive digital data. In particular, the wireless unit 340 may implement wireless standards (e.g. WiFi, Bluetooth, NFC, etc.), and may implement digital cellular telephony standards for data communication (e.g. CDMA, 3G, 4G, LTE, LTE-Advanced, etc.). Of course, any wireless standard or digital cellular telephony standards may be used.

In one embodiment, the digital photographic system 300 is configured to transmit one or more digital photographs to a network-based (online) or "cloud-based" photographic media service via the wireless unit 340. The one or more digital photographs may reside within either the NV memory 316 or the volatile memory 318, or any other memory device associated with the processor complex 310. In one embodiment, a user may possess credentials to access an online photographic media service and to transmit one or more digital photographs for storage to, retrieval from, and presentation by the online photographic media service. The credentials may be stored or generated within the digital photographic system 300 prior to transmission of the digital photographs. The online photographic media service may comprise a social networking service, photograph sharing service, or any other network-based service that provides storage of digital photographs, processing of digital photographs, transmission of digital photographs, sharing of digital photographs, or any combination thereof. In certain embodiments, one or more digital photographs are generated by the online photographic media service based on image data (e.g. image stack, HDR image stack, image package, etc.) transmitted to servers associated with the online photographic media service. In such embodiments, a user may upload one or more source images from the digital photographic system 300 for processing by the online photographic media service.

In one embodiment, the digital photographic system 300 comprises at least one instance of a camera module 330. In another embodiment, the digital photographic system 300 comprises a plurality of camera modules 330. Such an embodiment may also include at least one strobe unit 336 configured to illuminate a photographic scene, sampled as multiple views by the plurality of camera modules 330. The plurality of camera modules 330 may be configured to sample a wide angle view (e.g., greater than forty-five degrees of sweep among cameras) to generate a panoramic photograph. In one embodiment, a plurality of camera modules 330 may be configured to sample two or more narrow angle views (e.g., less than forty-five degrees of sweep among cameras) to generate a stereoscopic photograph. In other embodiments, a plurality of camera modules 330 may be configured to generate a 3-D image or to otherwise display a depth perspective (e.g. a z-component, etc.) as shown on the display unit 312 or any other display device.

In one embodiment, a display unit 312 may be configured to display a two-dimensional array of pixels to form an image for display. The display unit 312 may comprise a liquid-crystal (LCD) display, a light-emitting diode (LED) display, an organic LED display, or any other technically feasible type of display. In certain embodiments, the display unit 312 may be able to display a narrower dynamic range of image intensity values than a complete range of intensity values sampled from a photographic scene, such as within a single HDR image or over a set of two or more images comprising a multiple exposure or HDR image stack. In one embodiment, images comprising an image stack may be merged according to any technically feasible HDR blending technique to generate a synthetic image for display within dynamic range constraints of the display unit 312. In one embodiment, the limited dynamic range may specify an eight-bit per color channel binary representation of corresponding color intensities. In other embodiments, the limited dynamic range may specify more than eight-bits (e.g., 10 bits, 12 bits, or 14 bits, etc.) per color channel binary representation.

Figure 3B:
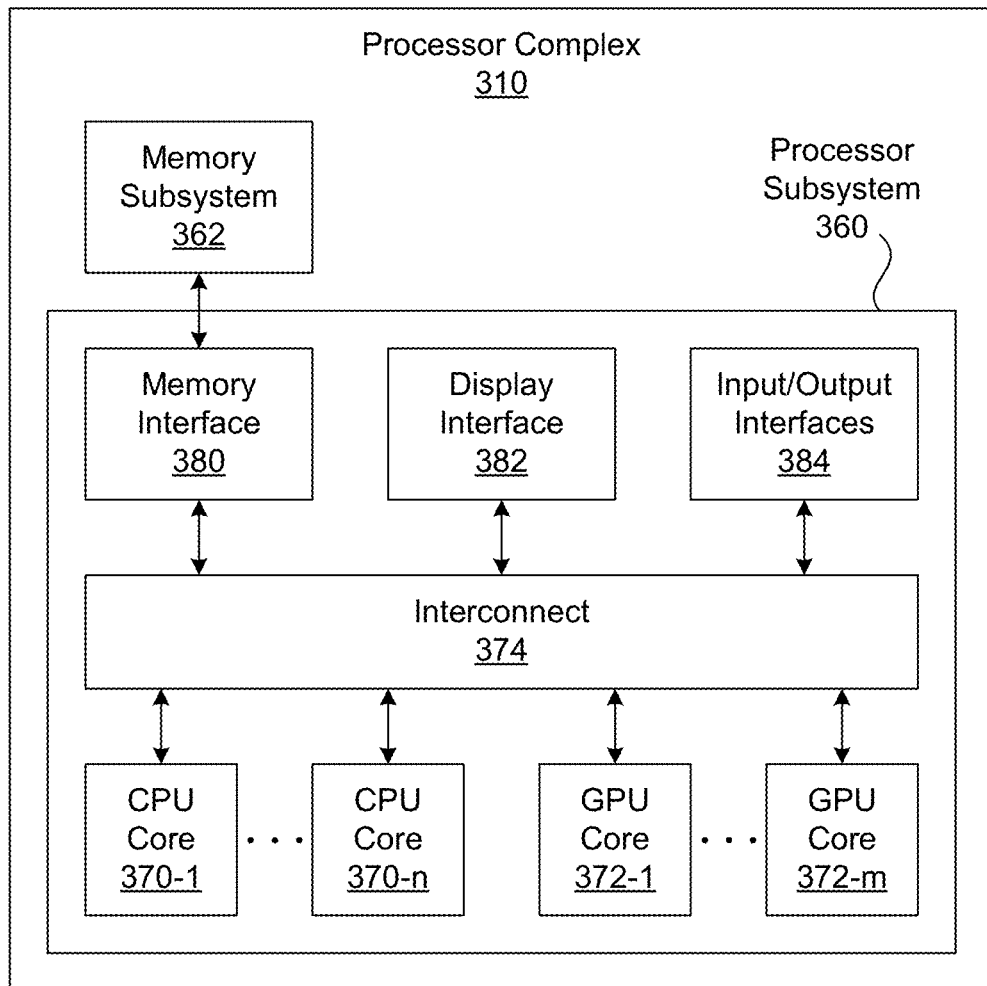
FIG. 3B illustrates a processor complex within the digital photographic system, according to one embodiment.

FIG. 3B illustrates a processor complex 310 within the digital photographic system 300 of FIG. 3A, in accordance with one embodiment. As an option, the processor complex 310 may be implemented in the context of the details of any of the Figures disclosed herein. Of course, however, the processor complex 310 may be implemented in any desired environment. Further, the aforementioned definitions may equally apply to the description below.

As shown, the processor complex 310 includes a processor subsystem 360 and may include a memory subsystem 362. In one embodiment, processor complex 310 may comprise a system on a chip (SoC) device that implements processor subsystem 360, and memory subsystem 362 comprises one or more DRAM devices coupled to the processor subsystem 360. In another embodiment, the processor complex 310 may comprise a multi-chip module (MCM) encapsulating the SoC device and the one or more DRAM devices comprising the memory subsystem 362.

The processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within the memory subsystem 362, volatile memory 318, NV memory 316, or any combination thereof. Each of the one or more CPU cores 370 may be configured to retrieve and store data through interconnect 374 and the memory interface 380. In one embodiment, each of the one or more CPU cores 370 may include a data cache, and an instruction cache. Additionally, two or more of the CPU cores 370 may share a data cache, an instruction cache, or any combination thereof. In one embodiment, a cache hierarchy is implemented to provide each CPU core 370 with a private cache layer, and a shared cache layer.

In some embodiments, processor subsystem 360 may include one or more graphics processing unit (GPU) cores 372. Each GPU core 372 may comprise a plurality of multi-threaded execution units that may be programmed to implement, without limitation, graphics acceleration functions. In various embodiments, the GPU cores 372 may be configured to execute multiple thread programs according to well-known standards (e.g. OpenGL™, WebGL™, OpenCL™, CUDA™, etc.), and/or any other programmable rendering graphic standard. In certain embodiments, at least one GPU core 372 implements at least a portion of a motion estimation function, such as a well-known Harris detector or a well-known Hessian-Laplace detector. Such a motion estimation function may be used at least in part to align images or portions of images within an image stack. For example, in one embodiment, an HDR image may be compiled based on an image stack, where two or more images are first aligned prior to compiling the HDR image.

As shown, the interconnect 374 is configured to transmit data between and among the memory interface 380, the display interface unit 382, the input/output interfaces unit 384, the CPU cores 370, and the GPU cores 372. In various embodiments, the interconnect 374 may implement one or more buses, one or more rings, a cross-bar, a mesh, or any other technically feasible data transmission structure or technique. The memory interface 380 is configured to couple the memory subsystem 362 to the interconnect 374. The memory interface 380 may also couple NV memory 316, volatile memory 318, or any combination thereof to the interconnect 374. The display interface unit 382 may be configured to couple a display unit 312 to the interconnect 374. The display interface unit 382 may implement certain frame buffer functions (e.g. frame refresh, etc.). Alternatively, in another embodiment, the display unit 312 may implement certain frame buffer functions (e.g. frame refresh, etc.). The input/output interfaces unit 384 may be configured to couple various input/output devices to the interconnect 374.

In certain embodiments, a camera module 330 is configured to store exposure parameters for sampling each image associated with an image stack. For example, in one embodiment, when directed to sample a photographic scene, the camera module 330 may sample a set of images comprising the image stack according to stored exposure parameters. A software module comprising programming instructions executing within a processor complex 310 may generate and store the exposure parameters prior to directing the camera module 330 to sample the image stack. In other embodiments, the camera module 330 may be used to meter an image or an image stack, and the software module comprising programming instructions executing within a processor complex 310 may generate and store metering parameters prior to directing the camera module 330 to capture the image. Of course, the camera module 330 may be used in any manner in combination with the processor complex 310.

In one embodiment, exposure parameters associated with images comprising the image stack may be stored within an exposure parameter data structure that includes exposure parameters for one or more images. In another embodiment, a camera interface unit (not shown in FIG. 3B) within the processor complex 310 may be configured to read exposure parameters from the exposure parameter data structure and to transmit associated exposure parameters to the camera module 330 in preparation of sampling a photographic scene. After the camera module 330 is configured according to the exposure parameters, the camera interface may direct the camera module 330 to sample the photographic scene; the camera module 330 may then generate a corresponding image stack. The exposure parameter data structure may be stored within the camera interface unit, a memory circuit within the processor complex 310, volatile memory 318, NV memory 316, the camera module 330, or within any other technically feasible memory circuit. Further, in another embodiment, a software module executing within processor complex 310 may generate and store the exposure parameter data structure.

Figure 3C:
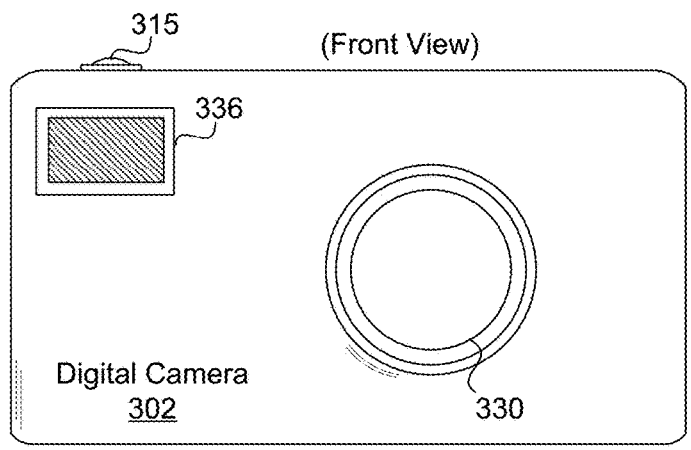
FIG. 3C illustrates a digital camera, in accordance with an embodiment.

FIG. 3C illustrates a digital camera 302, in accordance with one embodiment. As an option, the digital camera 302 may be implemented in the context of the details of any of the Figures disclosed herein. Of course, however, the digital camera 302 may be implemented in any desired environment. Further, the aforementioned definitions may equally apply to the description below.

In one embodiment, the digital camera 302 may be configured to include a digital photographic system, such as digital photographic system 300 of FIG. 3A. As shown, the digital camera 302 includes a camera module 330, which may include optical elements configured to focus optical scene information representing a photographic scene onto an image sensor, which may be configured to convert the optical scene information to an electronic representation of the photographic scene.

Additionally, the digital camera 302 may include a strobe unit 336, and may include a shutter release button 315 for triggering a photographic sample event, whereby digital camera 302 samples one or more images comprising the electronic representation. In other embodiments, any other technically feasible shutter release mechanism may trigger the photographic sample event (e.g. such as a timer trigger or remote control trigger, etc.).

Figure 3D:
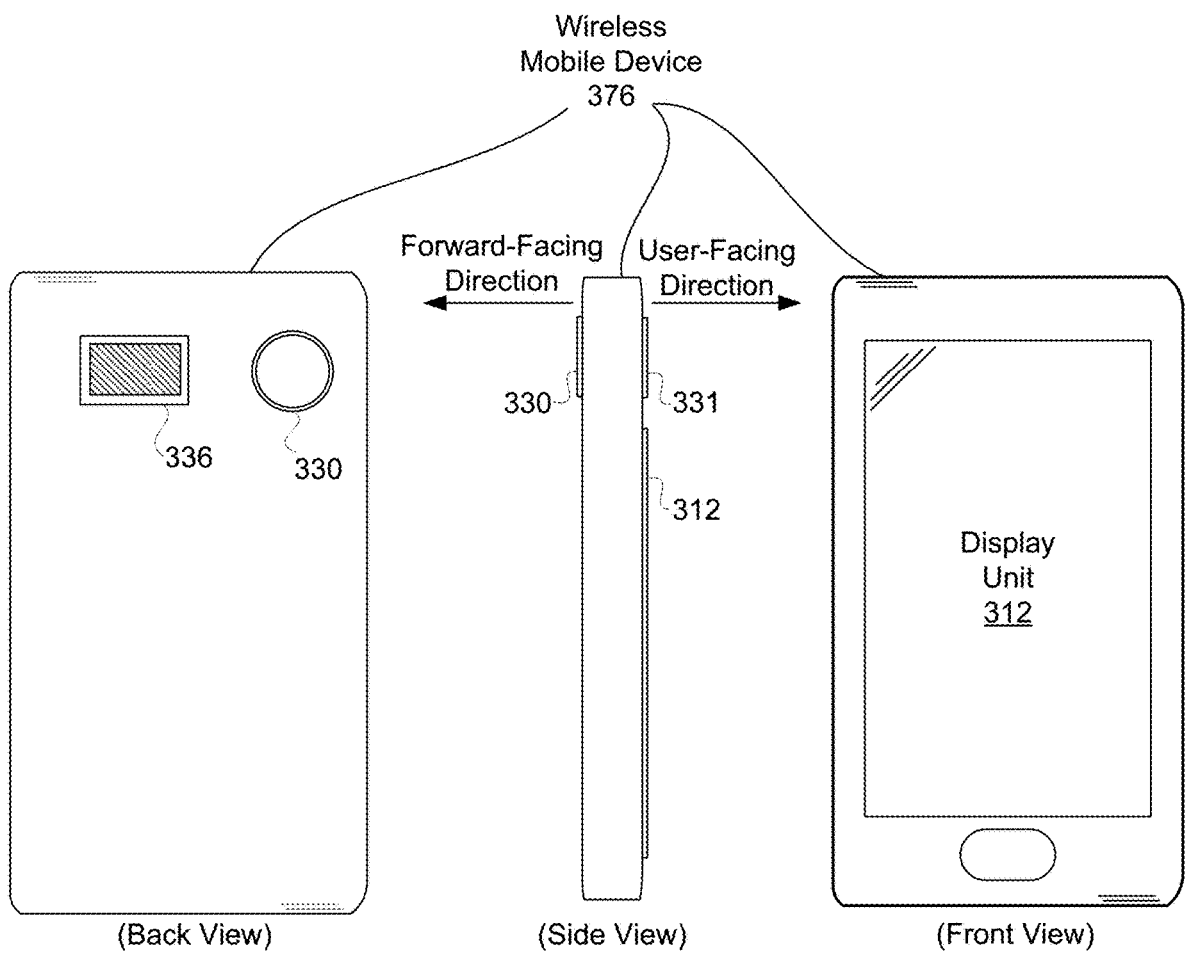
FIG. 3D illustrates a wireless mobile device, in accordance with another embodiment.

FIG. 3D illustrates a wireless mobile device 376, in accordance with one embodiment. As an option, the mobile device 376 may be implemented in the context of the details of any of the Figures disclosed herein. Of course, however, the mobile device 376 may be implemented in any desired environment. Further, the aforementioned definitions may equally apply to the description below.

In one embodiment, the mobile device 376 may be configured to include a digital photographic system (e.g. such as digital photographic system 300 of FIG. 3A), which is configured to sample a photographic scene. In various embodiments, a camera module 330 may include optical elements configured to focus optical scene information representing the photographic scene onto an image sensor, which may be configured to convert the optical scene information to an electronic representation of the photographic scene. Further, a shutter release command may be generated through any technically feasible mechanism, such as a virtual button, which may be activated by a touch gesture on a touch entry display system comprising display unit 312, or a physical button, which may be located on any face or surface of the mobile device 376. Of course, in other embodiments, any number of other buttons, external inputs/outputs, or digital inputs/outputs may be included on the mobile device 376, and which may be used in conjunction with the camera module 330.

As shown, in one embodiment, a touch entry display system comprising display unit 312 is disposed on the opposite side of mobile device 376 from camera module 330. In certain embodiments, the mobile device 376 includes a user-facing camera module 331 and may include a user-facing strobe unit (not shown). Of course, in other embodiments, the mobile device 376 may include any number of user-facing camera modules or rear-facing camera modules, as well as any number of user-facing strobe units or rear-facing strobe units.

In some embodiments, the digital camera 302 and the mobile device 376 may each generate and store a synthetic image based on an image stack sampled by camera module 330. The image stack may include one or more images sampled under ambient lighting conditions, one or more images sampled under strobe illumination from strobe unit 336, or a combination thereof.

Figure 3E:
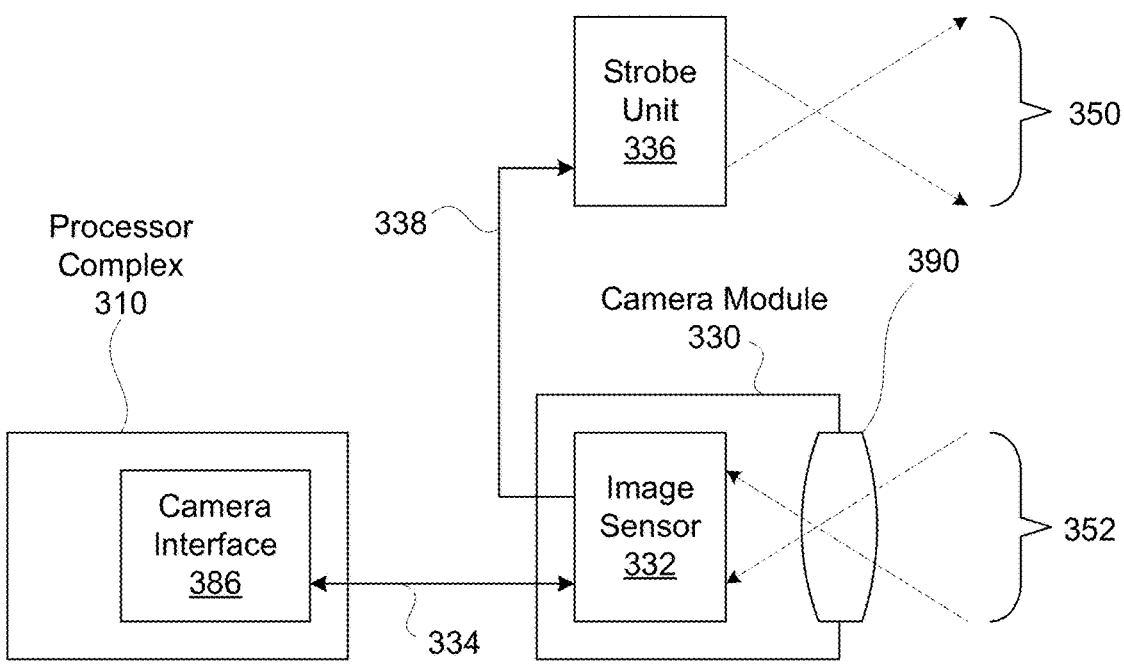
FIG. 3E illustrates a camera module configured to sample an image, according to one embodiment.

FIG. 3E illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to control strobe unit 336 through strobe control signal 338. As shown, a lens 390 is configured to focus optical scene information 352 onto image sensor 332 to be sampled. In one embodiment, image sensor 332 advantageously controls detailed timing of the strobe unit 336 though the strobe control signal 338 to reduce inter-sample time between an image sampled with the strobe unit 336 enabled, and an image sampled with the strobe unit 336 disabled. For example, the image sensor 332 may enable the strobe unit 336 to emit strobe illumination 350 less than one microsecond (or any desired length) after image sensor 332 completes an exposure time associated with sampling an ambient image and prior to sampling a strobe image.

In other embodiments, the strobe illumination 350 may be configured based on a desired one or more target points. For example, in one embodiment, the strobe illumination 350 may light up an object in the foreground, and depending on the length of exposure time, may also light up an object in the background of the image. In one embodiment, once the strobe unit 336 is enabled, the image sensor 332 may then immediately begin exposing a strobe image. The image sensor 332 may thus be able to directly control sampling operations, including enabling and disabling the strobe unit 336 associated with generating an image stack, which may comprise at least one image sampled with the strobe unit 336 disabled, and at least one image sampled with the strobe unit 336 either enabled or disabled. In one embodiment, data comprising the image stack sampled by the image sensor 332 is transmitted via interconnect 334 to a camera interface unit 386 within processor complex 310. In some embodiments, the camera module 330 may include an image sensor controller (e.g., controller 333 of FIG. 3G), which may be configured to generate the strobe control signal 338 in conjunction with controlling operation of the image sensor 332.

Figure 3F:
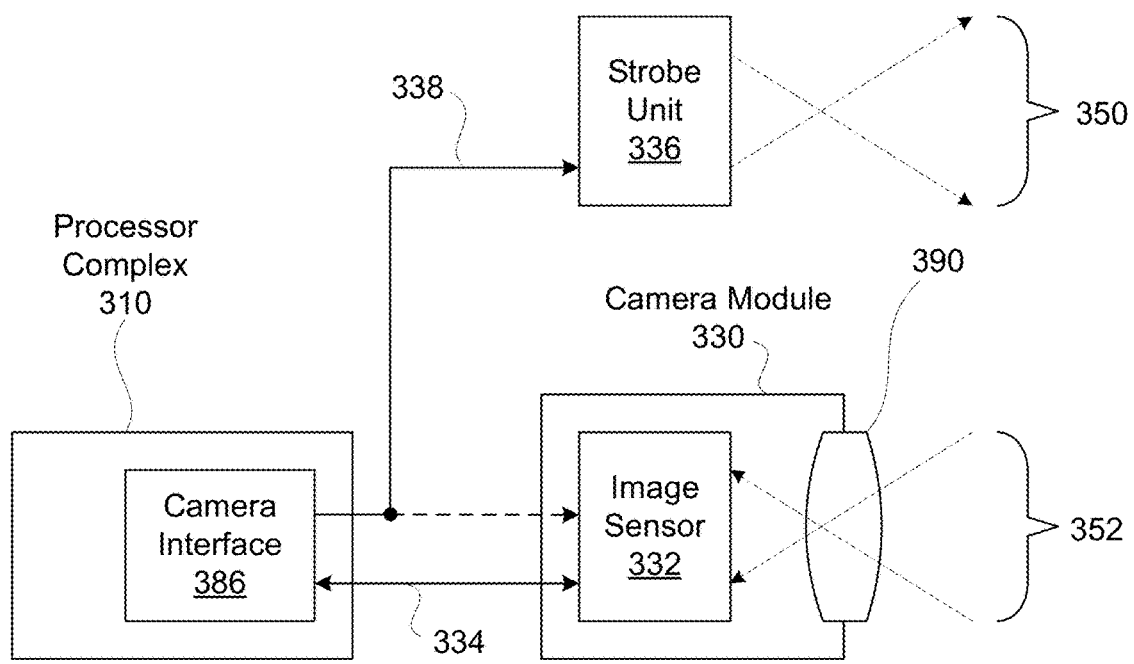
FIG. 3F illustrates a camera module configured to sample an image, according to another embodiment.

FIG. 3F illustrates a camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to sample an image based on state information for strobe unit 336. The state information may include, without limitation, one or more strobe parameters (e.g. strobe intensity, strobe color, strobe time, etc.), for directing the strobe unit 336 to generate a specified intensity and/or color of the strobe illumination 350. In one embodiment, commands for configuring the state information associated with the strobe unit 336 may be transmitted through a strobe control signal 338, which may be monitored by the camera module 330 to detect when the strobe unit 336 is enabled. For example, in one embodiment, the camera module 330 may detect when the strobe unit 336 is enabled or disabled within a microsecond or less of the strobe unit 336 being enabled or disabled by the strobe control signal 338. To sample an image requiring strobe illumination, a camera interface unit 386 may enable the strobe unit 336 by sending an enable command through the strobe control signal 338. In one embodiment, the camera interface unit 386 may be included as an interface of input/output interfaces 384 in a processor subsystem 360 of the processor complex 310 of FIG. 3B. The enable command may comprise a signal level transition, a data packet, a register write, or any other technically feasible transmission of a command. The camera module 330 may sense that the strobe unit 336 is enabled and then cause image sensor 332 to sample one or more images requiring strobe illumination while the strobe unit 336 is enabled. In such an implementation, the image sensor 332 may be configured to wait for an enable signal destined for the strobe unit 336 as a trigger signal to begin sampling a new exposure.

In one embodiment, camera interface unit 386 may transmit exposure parameters and commands to camera module 330 through interconnect 334. In certain embodiments, the camera interface unit 386 may be configured to directly control strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In one embodiment, precise time synchronization may be less than five hundred microseconds of event timing error. Additionally, event timing error may be a difference in time from an intended event occurrence to the time of a corresponding actual event occurrence.

In another embodiment, camera interface unit 386 may be configured to accumulate statistics while receiving image data from camera module 330. In particular, the camera interface unit 386 may accumulate exposure statistics for a given image while receiving image data for the image through interconnect 334. Exposure statistics may include, without limitation, one or more of an intensity histogram, a count of over-exposed pixels, a count of under-exposed pixels, an intensity-weighted sum of pixel intensity, or any combination thereof. The camera interface unit 386 may present the exposure statistics as memory-mapped storage locations within a physical or virtual address space defined by a processor, such as one or more of CPU cores 370, within processor complex 310. In one embodiment, exposure statistics reside in storage circuits that are mapped into a memory-mapped register space, which may be accessed through the interconnect 334. In other embodiments, the exposure statistics are transmitted in conjunction with transmitting pixel data for a captured image. For example, the exposure statistics for a given image may be transmitted as in-line data, following transmission of pixel intensity data for the captured image. Exposure statistics may be calculated, stored, or cached within the camera interface unit 386. In other embodiments, an image sensor controller within camera module 330 may be configured to accumulate the exposure statistics and transmit the exposure statistics to processor complex 310, such as by way of camera interface unit 386. In one embodiment, the exposure statistics are accumulated within the camera module 330 and transmitted to the camera interface unit 386, either in conjunction with transmitting image data to the camera interface unit 386, or separately from transmitting image data.

In one embodiment, camera interface unit 386 may accumulate color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image. As with the exposure statistics, the color statistics may be presented as memory-mapped storage locations within processor complex 310. In one embodiment, the color statistics may be mapped in a memory-mapped register space, which may be accessed through interconnect 334. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386. In other embodiments, the image sensor controller within camera module 330 may be configured to accumulate the color statistics and transmit the color statistics to processor complex 310, such as by way of camera interface unit 386. In one embodiment, the color statistics may be accumulated within the camera module 330 and transmitted to the camera interface unit 386, either in conjunction with transmitting image data to the camera interface unit 386, or separately from transmitting image data.

In one embodiment, camera interface unit 386 may accumulate spatial color statistics for performing color-matching between or among images, such as between or among an ambient image and one or more images sampled with strobe illumination. As with the exposure statistics, the spatial color statistics may be presented as memory-mapped storage locations within processor complex 310. In one embodiment, the spatial color statistics are mapped in a memory-mapped register space. In another embodiment the camera module may be configured to accumulate the spatial color statistics, which may be accessed through interconnect 334. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386.

In one embodiment, camera module 330 may transmit strobe control signal 338 to strobe unit 336, enabling the strobe unit 336 to generate illumination while the camera module 330 is sampling an image. In another embodiment, camera module 330 may sample an image illuminated by strobe unit 336 upon receiving an indication signal from camera interface unit 386 that the strobe unit 336 is enabled. In yet another embodiment, camera module 330 may sample an image illuminated by strobe unit 336 upon detecting strobe illumination within a photographic scene via a rapid rise in scene illumination. In one embodiment, a rapid rise in scene illumination may include at least a rate of increasing intensity consistent with that of enabling strobe unit 336. In still yet another embodiment, camera module 330 may enable strobe unit 336 to generate strobe illumination while sampling one image, and disable the strobe unit 336 while sampling a different image.

Figure 3G:
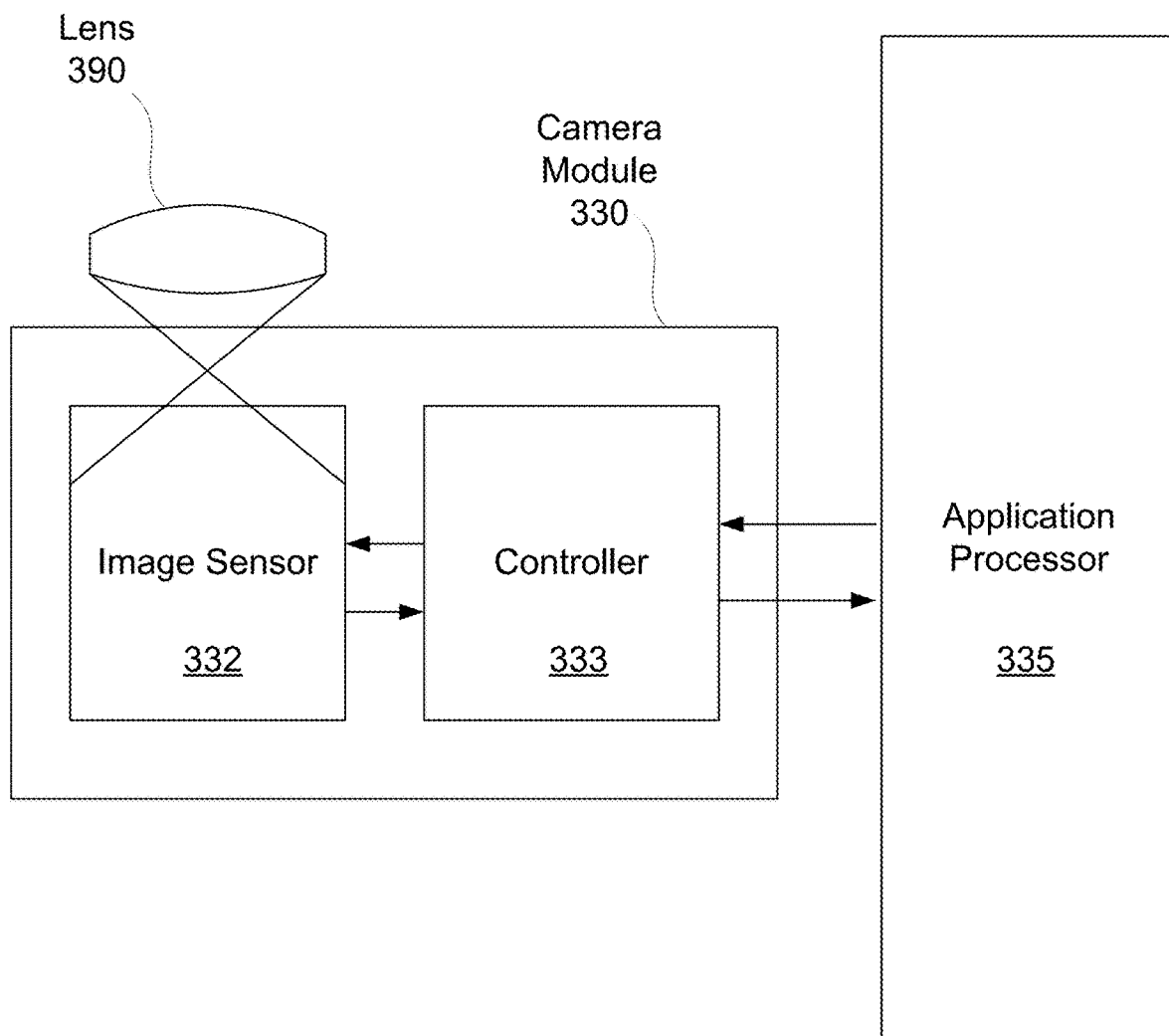
FIG. 3G illustrates a camera module in communication with an application processor, in accordance with an embodiment.

FIG. 3G illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be in communication with an application processor 335. The camera module 330 is shown to include image sensor 332 in communication with a controller 333. Further, the controller 333 is shown to be in communication with the application processor 335.

In one embodiment, the application processor 335 may reside outside of the camera module 330. As shown, the lens 390 may be configured to focus optical scene information to be sampled onto image sensor 332. The optical scene information sampled by the image sensor 332 may then be communicated from the image sensor 332 to the controller 333 for at least one of subsequent processing and communication to the application processor 335. In another embodiment, the controller 333 may control storage of the optical scene information sampled by the image sensor 332, or storage of processed optical scene information.

In another embodiment, the controller 333 may enable a strobe unit to emit strobe illumination for a short time duration (e.g. less than ten milliseconds) after image sensor 332 completes an exposure time associated with sampling an ambient image. Further, the controller 333 may be configured to generate strobe control signal 338 in conjunction with controlling operation of the image sensor 332.

In one embodiment, the image sensor 332 may be a complementary metal oxide semiconductor (CMOS) sensor or a charge-coupled device (CCD) sensor. In another embodiment, the controller 333 and the image sensor 332 may be packaged together as an integrated system, multi-chip module, multi-chip stack, or integrated circuit. In yet another embodiment, the controller 333 and the image sensor 332 may comprise discrete packages. In one embodiment, the controller 333 may provide circuitry for receiving optical scene information from the image sensor 332, processing of the optical scene information, timing of various functionalities, and signaling associated with the application processor 335. Further, in another embodiment, the controller 333 may provide circuitry for control of one or more of exposure, shuttering, white balance, and gain adjustment. Processing of the optical scene information by the circuitry of the controller 333 may include one or more of gain application, amplification, and analog-to-digital conversion. After processing the optical scene information, the controller 333 may transmit corresponding digital pixel data, such as to the application processor 335.

In one embodiment, the application processor 335 may be implemented on processor complex 310 and at least one of volatile memory 318 and NV memory 316, or any other memory device and/or system. The application processor 335 may be previously configured for processing of received optical scene information or digital pixel data communicated from the camera module 330 to the application processor 335.

Figure 4:
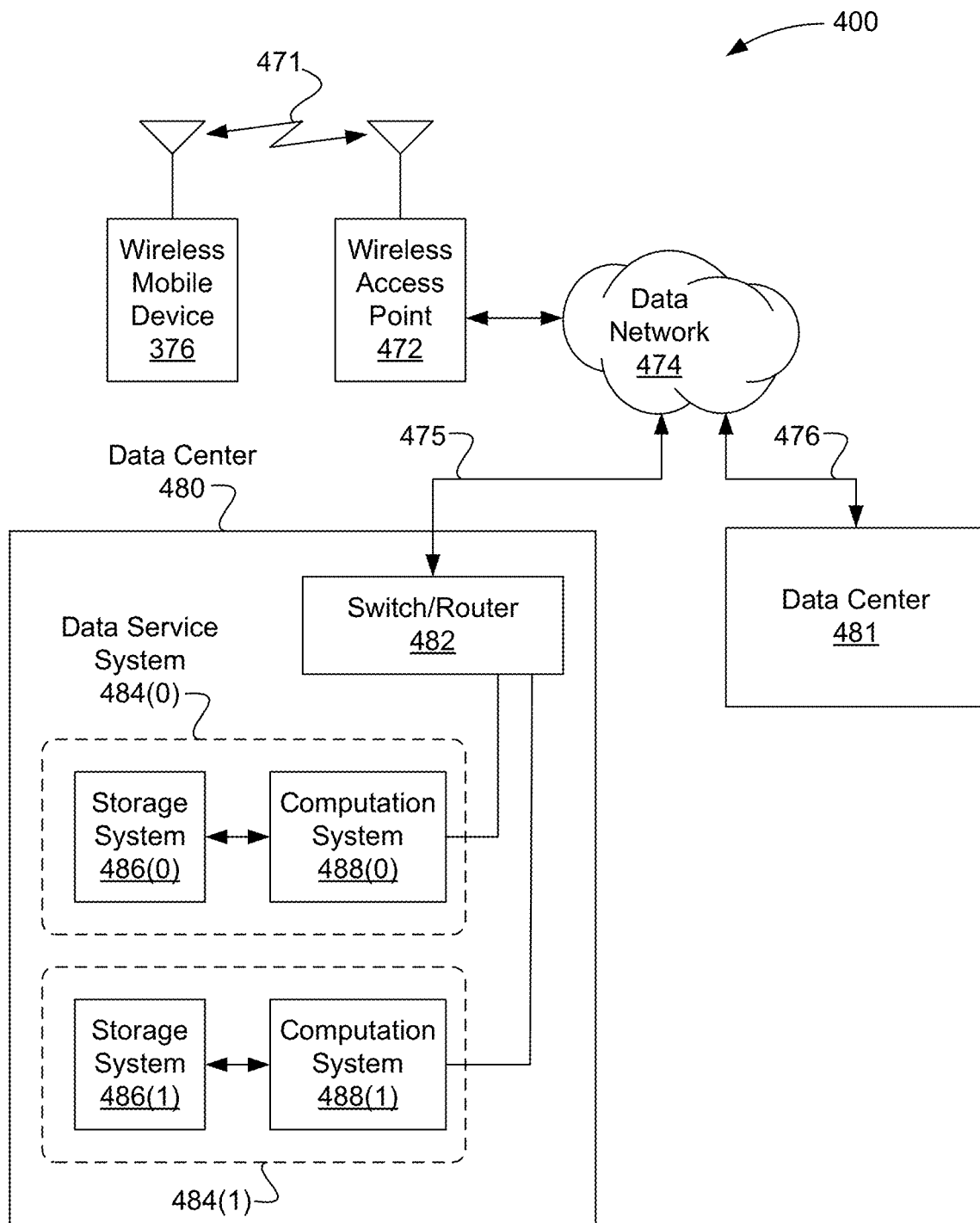
FIG. 4 illustrates a network service system, in accordance with another embodiment.

FIG. 4 illustrates a network service system 400, in accordance with one embodiment. As an option, the network service system 400 may be implemented in the context of the details of any of the Figures disclosed herein. Of course, however, the network service system 400 may be implemented in any desired environment. Further, the aforementioned definitions may equally apply to the description below.

In one embodiment, the network service system 400 may be configured to provide network access to a device implementing a digital photographic system. As shown, network service system 400 includes a wireless mobile device 376, a wireless access point 472, a data network 474, a data center 480, and a data center 481. The wireless mobile device 376 may communicate with the wireless access point 472 via a digital radio link 471 to send and receive digital data, including data associated with digital images. The wireless mobile device 376 and the wireless access point 472 may implement any technically feasible transmission techniques for transmitting digital data via digital radio link 471 without departing the scope and spirit of the present invention. In certain embodiments, one or more of data centers 480, 481 may be implemented using virtual constructs so that each system and subsystem within a given data center 480, 481 may comprise virtual machines configured to perform data processing and network data transmission tasks. In other implementations, one or more of data centers 480, 481 may be physically distributed over a plurality of physical sites.

The wireless mobile device 376 may comprise a smart phone configured to include a digital camera, a digital camera configured to include wireless network connectivity, a reality augmentation device, a laptop configured to include a digital camera and wireless network connectivity, or any other technically feasible computing device configured to include a digital photographic system and wireless network connectivity.

In various embodiments, the wireless access point 472 may be configured to communicate with wireless mobile device 376 via the digital radio link 471 and to communicate with the data network 474 via any technically feasible transmission media, such as any electrical, optical, or radio transmission media. For example, in one embodiment, wireless access point 472 may communicate with data network 474 through an optical fiber coupled to the wireless access point 472 and to a router system or a switch system within the data network 474. A network link 475, such as a wide area network (WAN) link, may be configured to transmit data between the data network 474 and the data center 480.

In one embodiment, the data network 474 may include routers, switches, long-haul transmission systems, provisioning systems, authorization systems, and any technically feasible combination of communications and operations subsystems configured to convey data between network endpoints, such as between the wireless access point 472 and the data center 480. In one implementation scenario, wireless mobile device 376 may comprise one of a plurality of wireless mobile devices configured to communicate with the data center 480 via one or more wireless access points coupled to the data network 474.

Additionally, in various embodiments, the data center 480 may include, without limitation, a switch/router 482 and at least one data service system 484. The switch/router 482 may be configured to forward data traffic between and among a network link 475, and each data service system 484. The switch/router 482 may implement any technically feasible transmission techniques, such as Ethernet media layer transmission, layer 2 switching, layer 3 routing, and the like. The switch/router 482 may comprise one or more individual systems configured to transmit data between the data service systems 484 and the data network 474.

In one embodiment, the switch/router 482 may implement session-level load balancing among a plurality of data service systems 484. Each data service system 484 may include at least one computation system 488 and may also include one or more storage systems 486. Each computation system 488 may comprise one or more processing units, such as a central processing unit, a graphics processing unit, or any combination thereof. A given data service system 484 may be implemented as a physical system comprising one or more physically distinct systems configured to operate together. Alternatively, a given data service system 484 may be implemented as a virtual system comprising one or more virtual systems executing on an arbitrary physical system. In certain scenarios, the data network 474 may be configured to transmit data between the data center 480 and another data center 481, such as through a network link 476.

In another embodiment, the network service system 400 may include any networked mobile devices configured to implement one or more embodiments of the present invention. For example, in some embodiments, a peer-to-peer network, such as an ad-hoc wireless network, may be established between two different wireless mobile devices. In such embodiments, digital image data may be transmitted between the two wireless mobile devices without having to send the digital image data to a data center 480.

Figure 5:
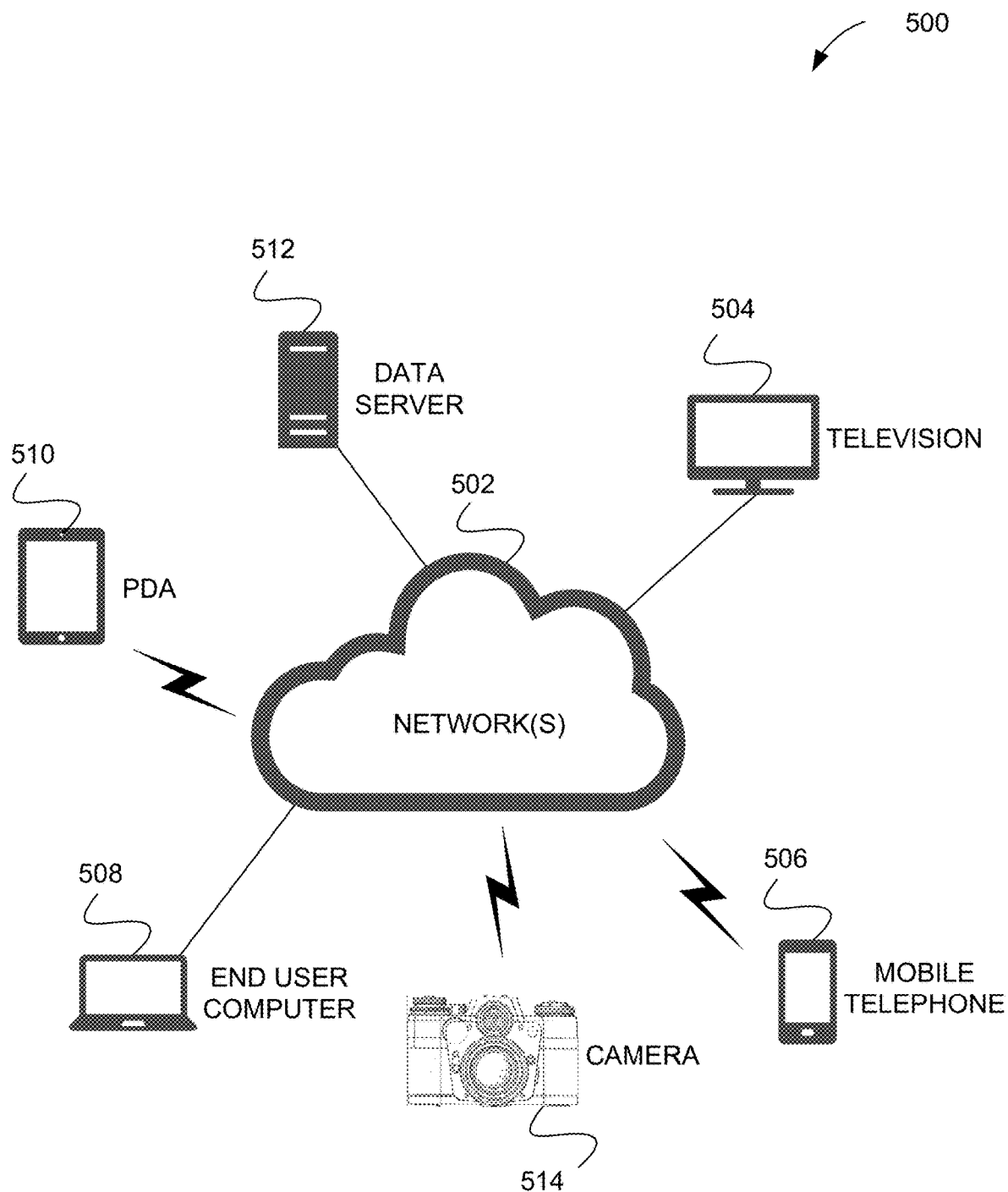
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 512 and an end user computer 508 may be coupled to the network 502 for communication purposes. Such end user computer 508 may include a desktop computer, lap-top computer, and/or any other type of logic. Still yet, various other devices may be coupled to the network 502 including a personal digital assistant (PDA) device 510, a mobile phone device 506, a television 504, a camera 514, etc.

Figure 6:
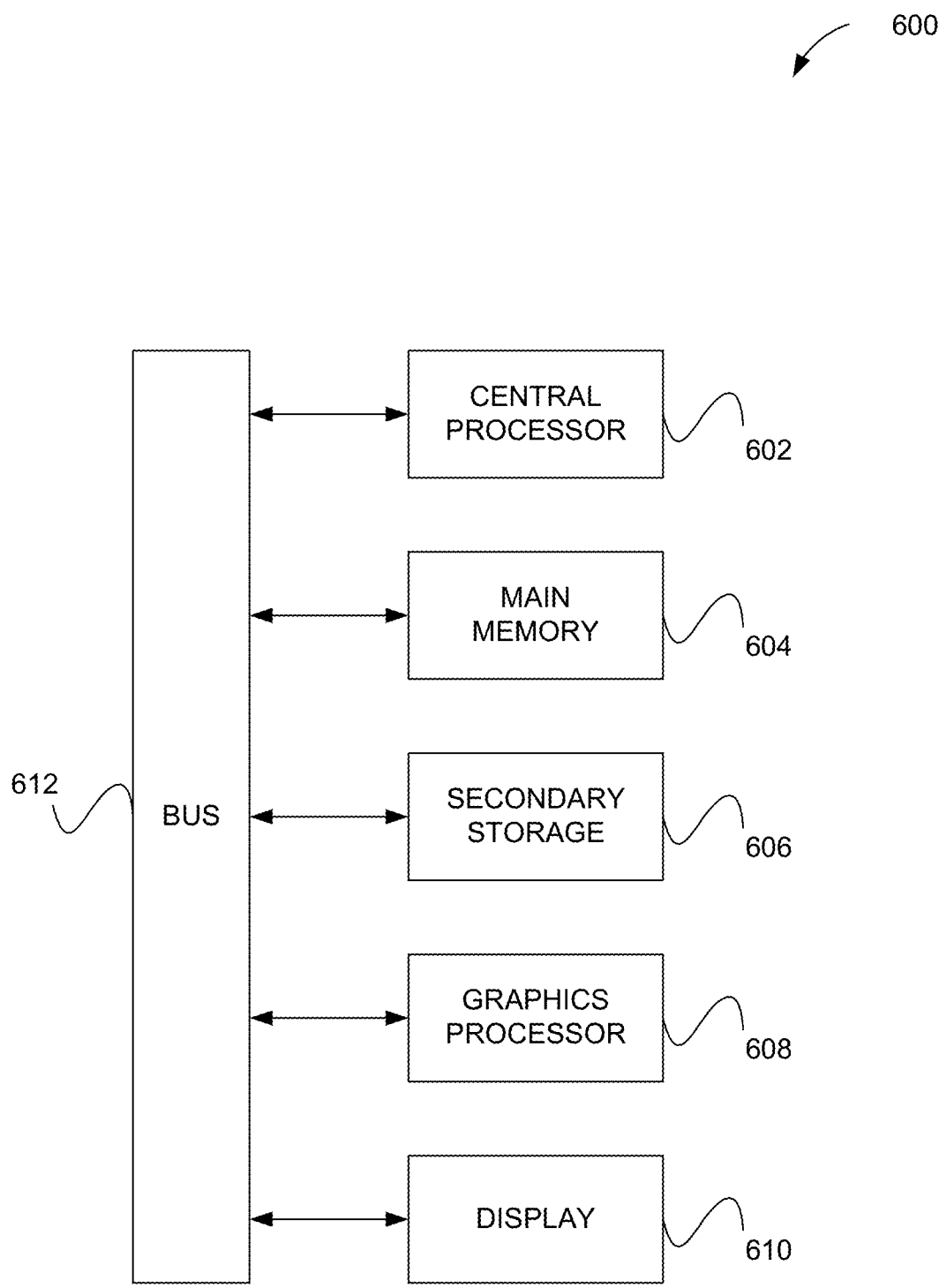
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 602 which is connected to a communication bus 612. The system 600 also includes main memory 604 [e.g. random access memory (RAM), etc.]. The system 600 also includes a graphics processor 608 and a display 610.

The system 600 may also include a secondary storage 606. The secondary storage 606 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604, the secondary storage 606, and/or any other memory, for that matter. Such computer programs, when executed, enable the system 600 to perform various functions (as set forth above, for example). Memory 604, storage 606 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A device, comprising:
a non-transitory memory storing instructions; and
one or more processors in communication with the non-transitory memory, wherein the one or more processors execute the instructions to:
receive a real-time face model, wherein the real-time face model includes one or more face data points and a plurality of face parameters, wherein the plurality of face parameters is correlated and occurs synchronously;
receive real-time face data points, including additional one or more face data points;
manipulate the real-time face model based on the real-time face data points.

2. The device of claim 1, wherein face model includes a structure of a face, the structure including a geometric mesh or collection of geometric objects.

3. The device of claim 1, wherein the one or more processors further execute the instructions to provide a real-time stream of at least one face associated with the real-time face model, the real-time stream being a video chat.

4. The device of claim 1, wherein the one or more processors further execute the instructions to map the real-time face model to control levers on an animation rigging.

5. The device of claim 1, wherein the manipulation includes modifying visual parameters associated with a face.

6. The device of claim 1, wherein the real-time face model includes at least two of facial contours, minute data points, or main data points.

7. The device of claim 1, wherein the plurality of face parameters are animation parameters associated with a particular movement and feature of at least one face.

8. The device of claim 7, wherein the animation parameters include at least two of a movement of eyes, a movement of a nose, a movement of a jaw, a movement of a face bone structure, a movement of eyebrows, or a movement of lips.

9. The device of claim 1, wherein the real-time face model includes audio data.

10. The device of claim 9, wherein the device is operable such that the audio data is used to create an inference of how the manipulation is performed.

11. The device of claim 1, wherein the real-time face model includes an image depth map, an audio map, and a correlation map.

12. The device of claim 11, wherein the correlation map matches up audio associated with one or more of phonetics, intonations, or emotions, with the one or more face data points.

13. The device of claim 1, wherein the device is operable such that receiving the real-time face model requires less data usage than receiving real time video frames.

14. The device of claim 1, wherein the device is operable such that the real-time face model is further refined using historical data or additional data associated with at least one face.

15. The device of claim 1, wherein the device is operable such that the real-time face model is automatically received based on a network latency threshold or a dropped packet threshold condition in place of additional video frames.

16. The device of claim 1, wherein the device is further operable to receive a second real-time face model associated with a third party individual or character, receive second real-time face data points, and manipulate the second real-time face model based on the second real-time face data points.

17. A method, comprising:
- receiving, using a processor, a real-time face model, wherein the real-time face model includes one or more face data points and a plurality of face parameters, wherein the plurality of face parameters is correlated and occurs synchronously;
- receiving, using the processor, real-time face data points, including additional one or more face data points;
- manipulating, using the processor, the real-time face model based on the real-time face data points.

18. A computer program product comprising computer executable instructions stored on a non-transitory computer readable medium that when executed by a processor instruct the processor to:
- receive a real-time face model, wherein the real-time face model includes one or more face data points and a plurality of face parameters, wherein the plurality of face parameters is correlated and occurs synchronously;
- receive real-time face data points, including additional one or more face data points;
- manipulate the real-time face model based on the real-time face data points.

* * * * *